US012796629B2

(12) United States Patent
Arthur et al.

(10) Patent No.: US 12,796,629 B2
(45) Date of Patent: Nov. 17, 2026

(54) VERTICALLY HANGING CULTIVATION SYSTEM

(71) Applicant: 3M INNOVATIVE PROPERTIES COMPANY, St. Paul, MN (US)

(72) Inventors: Jonathan B. Arthur, Hudson, WI (US); Milo G. Oien-Rochat, Minneapolis, MN (US); David L. Morrissey, St. Paul, MN (US); Subhalakshmi M. Falknor, Woodbury, MN (US); David H. Redinger, Afton, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/573,321

(22) PCT Filed: Jul. 5, 2022

(86) PCT No.: PCT/US2022/036096
§ 371 (c)(1),
(2) Date: Dec. 21, 2023

(87) PCT Pub. No.: WO2024/010568
PCT Pub. Date: Jan. 11, 2024

(65) Prior Publication Data
US 2025/0228174 A1 Jul. 17, 2025

(51) Int. Cl.
*A01G 31/02* (2006.01)

(52) U.S. Cl.
CPC .................................. *A01G 31/025* (2025.01)

(58) Field of Classification Search
CPC .................................................... A01G 31/025
See application file for complete search history.

(56) References Cited

U.S. PATENT DOCUMENTS 5,511,340 A * 4/1996 Kertz ..................... A01G 31/06 47/65
6,021,602 A * 2/2000 Orsi ....................... A01G 31/02 47/62 A
9,043,962 B2 * 6/2015 Trofe ................... A01G 31/025
(Continued)

FOREIGN PATENT DOCUMENTS

EP 2904894 A1 8/2015
KR 20160089290 A 7/2016
WO 2019245388 A2 12/2019

OTHER PUBLICATIONS

"Sharklet", Sharklet's Micropattern Mimics The Form And Function Of Sharkskin, URL: <https://www.sharklet.com/>, [retrieved on Feb. 15, 2024], 2024, pp. 1-6.
(Continued)

*Primary Examiner* — Marisa V Conlon
(74) *Attorney, Agent, or Firm* — Philip P. Soo

(57) ABSTRACT

A cultivation system (100) includes a substantially vertical film (10) including a distribution of holes (12) each to receive a basket (50). A mounting mechanism (20) is disposed adjacent to a top edge of the vertical film. The system allows for a customized distribution of the holes and thus allows for the control of the spacing between the received baskets. The vertical film further includes water-guiding features (e.g., channels) to flow fluid primarily by gravity and direct the fluid to the holes.

20 Claims, 8 Drawing Sheets

(56) References Cited

U.S. PATENT DOCUMENTS

| | | | | |
|---|---|---|---|---|
| 9,629,313 | B1 * | 4/2017 | Grossman | G05D 7/0617 |
| 9,883,642 | B2 * | 2/2018 | Friedman | A01G 9/025 |
| 9,930,841 | B2 * | 4/2018 | Fankuchen | A01G 9/025 |
| 11,627,709 | B1 * | 4/2023 | Johnson | A01G 31/06<br>47/62 R |
| 12,004,673 | B1 * | 6/2024 | Bandzeviciene | A01G 9/024 |
| 12,349,635 | B2 * | 7/2025 | Reiner | A01G 9/0295 |
| 12,356,906 | B2 * | 7/2025 | Chaney | A01G 31/02 |
| 2011/0059518 | A1 * | 3/2011 | Bribach | A01G 9/025<br>435/266 |
| 2011/0302837 | A1 * | 12/2011 | Chen | B32B 27/12<br>47/65.8 |
| 2012/0005958 | A1 * | 1/2012 | Laitsch | A01G 31/02<br>47/62 R |
| 2016/0143234 | A1 | 5/2016 | Nasu | |
| 2020/0329654 | A1 | 10/2020 | Westlind et al. | |
| 2025/0000041 | A1 * | 1/2025 | Redington | A01G 31/02 |
| 2025/0194480 | A1 * | 6/2025 | Guglielmi | A01G 9/246 |

OTHER PUBLICATIONS

Besten, "Chapter 8.2—Vertical Farming Development; the Dutch Approach", Plant Factory Using Artificial Light, Adapting to Environmental Disruption and Clues to Agricultural Innovation, 2019, pp. 307-317.

International Search Report for PCT International Application No. PCT/US2022/036096, mailed on Feb. 22, 2023, 6 pages.

* cited by examiner

VERTICALLY HANGING CULTIVATION SYSTEM

CROSS-REFERENCE TO RELATED APPLICATIONS

This application is a national stage filing under 35 U.S.C. § 371 of International Patent Application No. PCT/US2022/036096, filed 5 Jul. 2022, the entire disclosure of which is incorporated herein by reference.

BACKGROUND

The industry of high-density vertical farming develops rapidly. Growing plants vertically allows to reduce the amount of fertilizer and pesticides because of the controlled space, managed air, and light. This is especially beneficial for growing vegetables. Indoor vertical gardening has become a huge trend. The industry of high-density vertical farming can produce high value, delicate, and difficult to transport crops in urban settings without damaging or spoiling for sale to consumers near their location.

SUMMARY

There is a desire for rapid production of custom cultivation systems that facilitate a diversity of crop options on demand design and production. In one aspect, the present disclosure describes a cultivation system including a vertical film extending substantially along a vertical direction, the vertical film comprising a plurality of holes each configured to receive a basket; and a mounting mechanism disposed adjacent to a top edge of the vertical film. The system allows for a customized distribution of the holes and thus allows for the control of the spacing between the received baskets. In some cases, the vertical film further includes a plurality of channels fluidly connected to the plurality of holes, the plurality of channels configured to flow fluid primarily by gravity and direct the fluid to the holes.

Various unexpected results and advantages are obtained in exemplary embodiments of the disclosure. One such advantage of exemplary embodiments of the present disclosure is that the use of vertical film growing sheets allows for the rapid conversion of traditional industrial spaces into agricultural spaces due to the ability to hang from traditional building crossbeam supports. The embodiments described herein also allow for the rapid conversion between types of crops through the changing out of vertical film growing sheets to facilitate different plant spacing and root sizing as well as water and nutrient support. This easy conversion is in contrast with the growing environments that require physical shelving and framing to support each level of plats or even each plant itself. Harvest is also aided by the ability to lower the growing sheets to a horizontal surface to allow for the access of an automated or manual process closer to the floor of the space.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
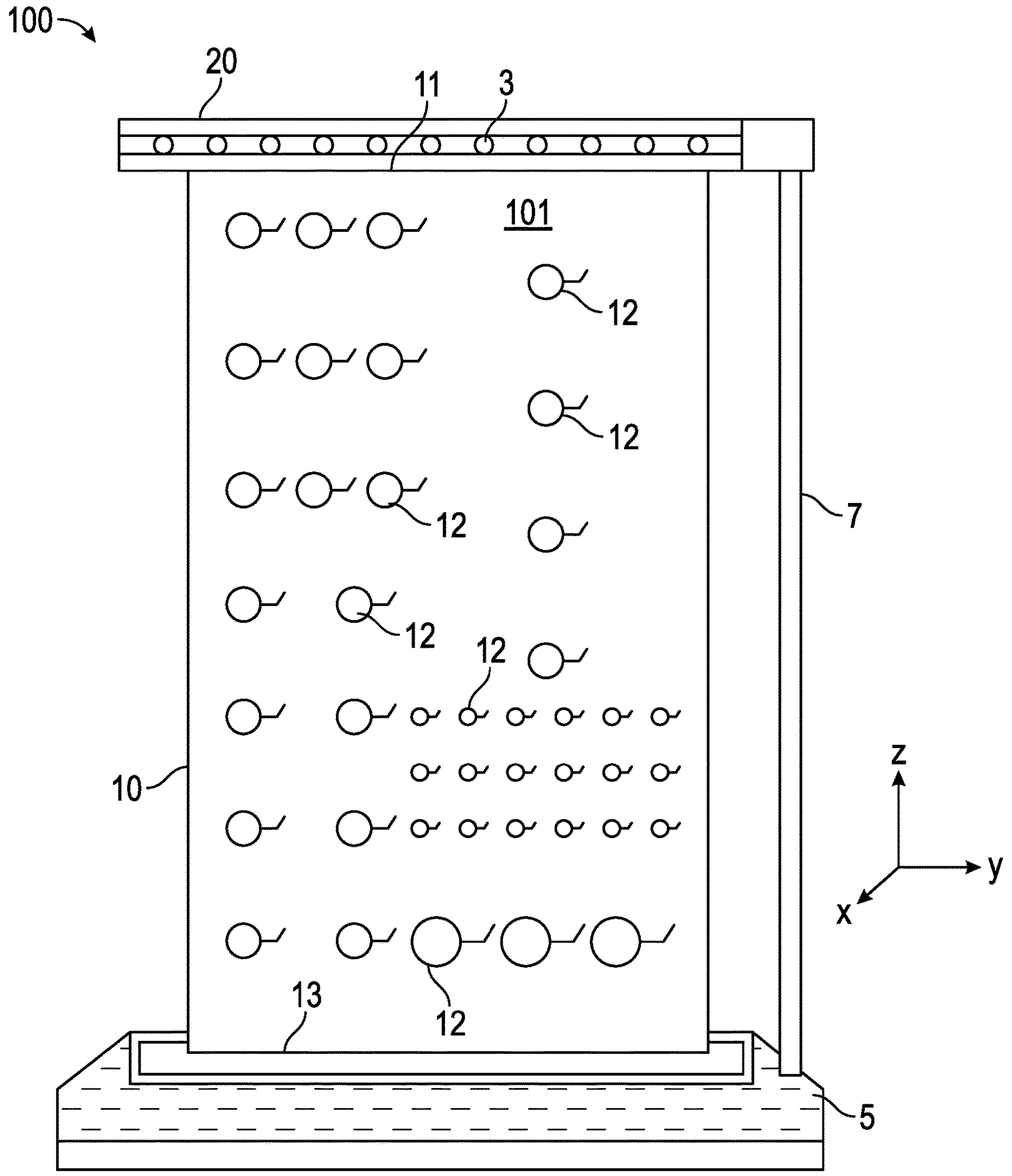
FIG. 1 illustrates a schematic diagram of a cultivation system, according to one embodiment.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

FIG. 1 illustrates a schematic diagram of a cultivation system 100, according to one embodiment. The cultivation system 100 includes a vertical film 10 extending substantially along a vertical direction (i.e., along the z axis in the Cartesian coordinate system) between the opposite edges 11 and 13. A mounting mechanism 20 is disposed adjacent to the top edge 11 of the vertical film 10 to mount the vertical film 10 to a fixture such as, for example, a frame, a ceiling, a water pipe, etc. A water and nutrient catch 5 is disposed adjacent to the bottom edge 13 of the vertical frame 10. A water line 7 extends between the top edge 11 of the vertical film 10 and the water and nutrient catch 5 to deliver water and nutrient onto a major surface 101 of the vertical film 10 adjacent to the top edge 11 thereof. The delivered water and nutrient can be distributed on the major surface 101 by water-guiding features to flow primarily by gravity downwardly toward the bottom edge 13 of the vertical film 10.

Figure 2A:
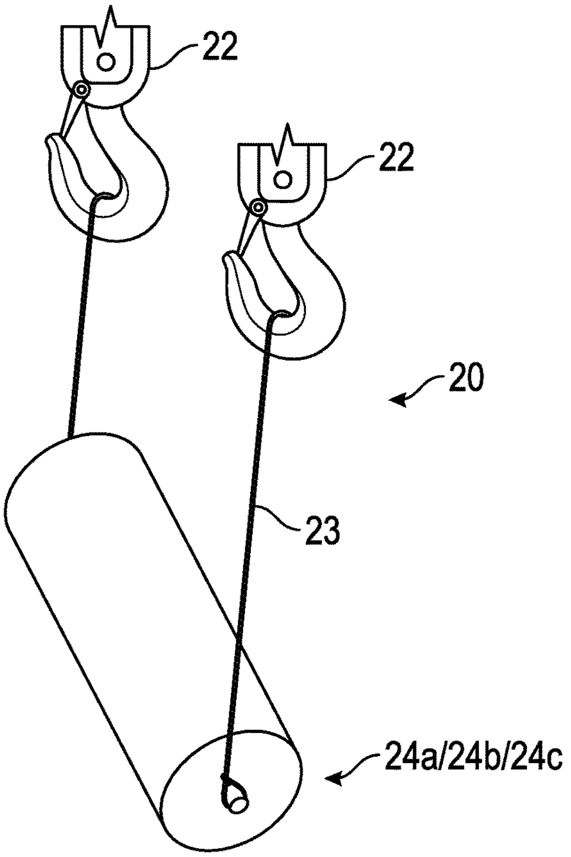
FIG. 2A illustrates a schematic diagram of a mounting mechanism, according to one embodiment.
Figure 2B:
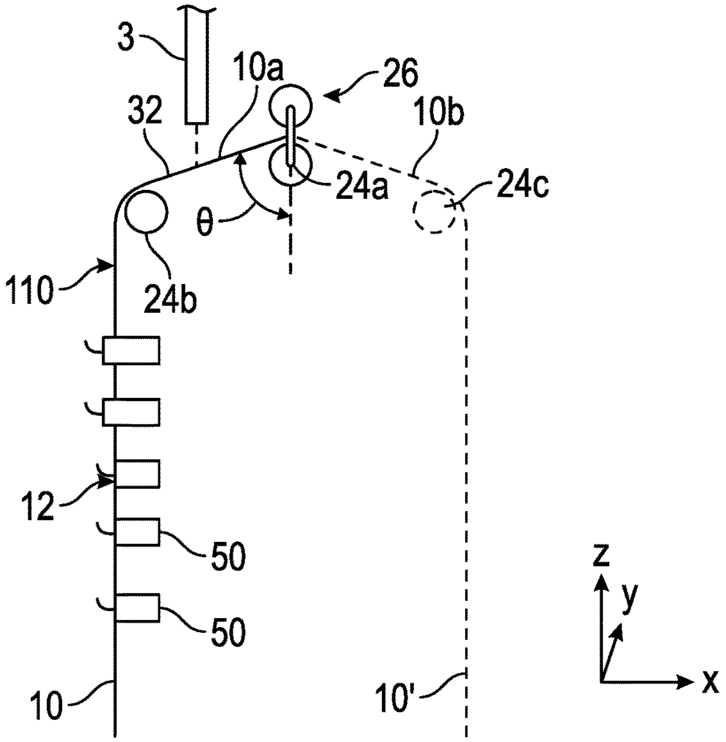
FIG. 2B illustrates a schematic diagram of a cultivation system, according to one embodiment.

In the embodiment depicted in FIG. 2A, the mounting mechanism 20 includes a pair of latching hooks 22 which can be attached to, e.g., a warehouse ceiling grid. One or more supports 24*a*, 24*b*, 24*c* are connected to the latching hooks 22 via hook cables 23. The vertical film 10 of FIG. 1 can be laid over one or more of the supports 24*a*, 24*b*, 24*c* and clamped in place by a clamping mechanism 26, as shown in FIG. 2B. The clamping mechanism 20 does not need to extend the entire length. The clamping mechanism 20 can be at the ends of a support to clamp the vertical film 10. When the vertical film 10 is mounted in place, a portion 10*a* of the vertical film 10 is disposed between the clamping mechanism 26 and the support 24*b*. The portion 10*a* has an inclined orientation from the vertical direction (i.e., the z axis). In some embodiments, the portion 10*a* may have an inclination angle θ with respect to the vertical direction in a range, for example, from about 5 degrees to about 89 degrees, from about 10 degrees to about 85 degrees, or from about 20 degrees to about 80 degrees.

In some embodiments, the cultivation system 100 may include multiple vertical films mounted via the mounting mechanism 20. In the embodiment depicted in FIG. 2B, an optional, second vertical film 10' is mounted along with the vertical film 10. Additional supports such as a support 24*c* is provided and an inclined portion 10*b* of the vertical film 10' is formed between the clamping mechanism 26 and the support 24*c*. It is to be understood that the vertical films 10, 10' may be separate films, or connected portions of a single film.

Figure 2C:
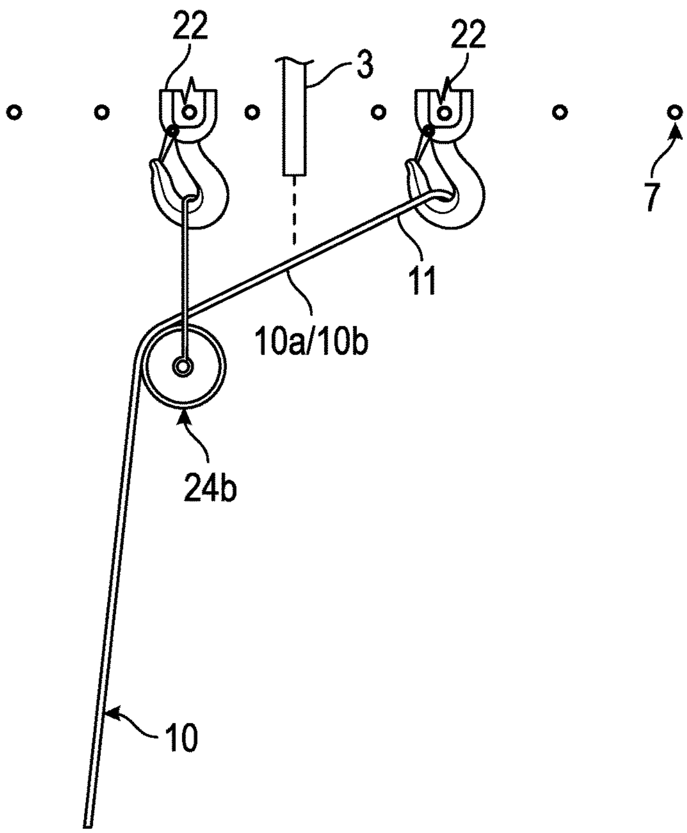
FIG. 2C illustrates a schematic diagram of a cultivation system, according to another embodiment.

In the embodiment depicted in FIG. 2C, the vertical film 10 includes a structural filament at the top edge 11 to attach a pair of latching hooks 22 which are attached a ceiling grid 8. The vertical film 10 is laid over a single support 24*b* to form the inclined portion 10*a*, 10*b* to receive fluid from a water source 3. In some embodiments, the latching hooks 22 may have its cable attached to the vertical film 10 via adhesives. In some embodiments, one or more latching hooks 22 may be integrated with the vertical film 10. For example, the integrated latching hooks can be formed by using origami techniques combined with cuts and perforations at the top edge of the vertical film, which can be converted to hook cables with integrated adhesive or hook and loop fasteners to capture the ceiling grid.

Figure 3:
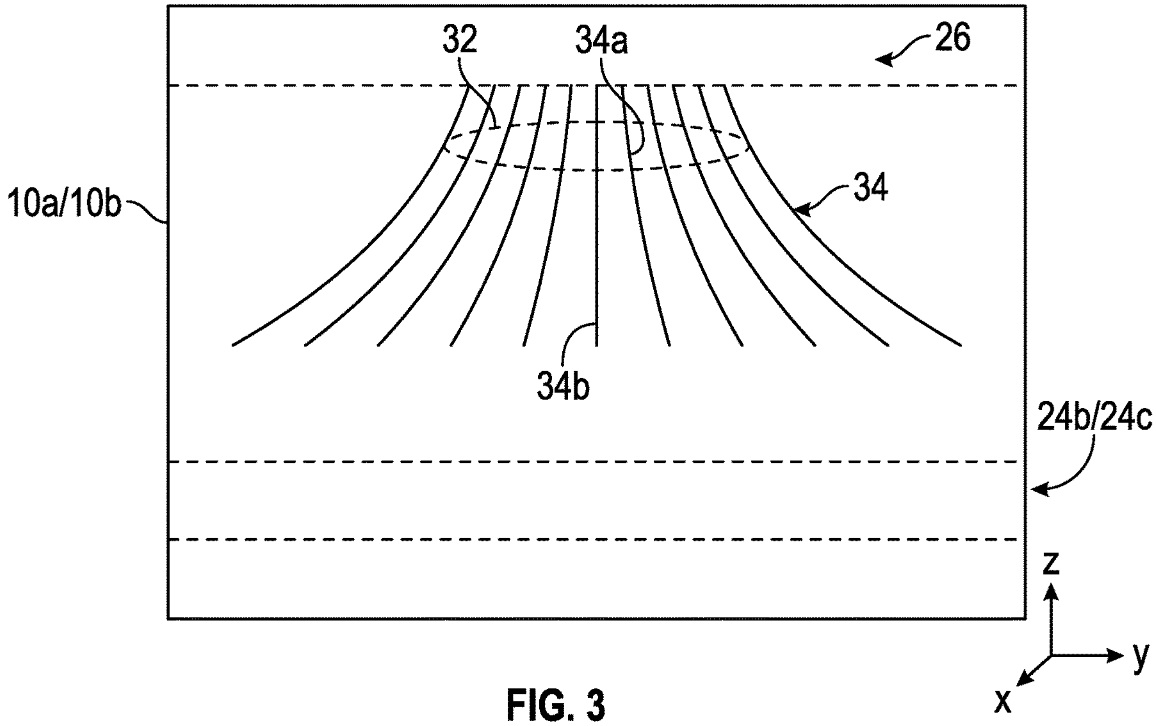
FIG. 3 illustrates a schematic diagram of a portion of a vertical film, according to one embodiment.

The inclined portions 10*a*, 10*b* each may include a splash zone to receive and distribute water and nutrient from the water source 3 fluidly connected to the water line 7. In the depicted embodiment of FIG. 3, a splash zone 32 is formed in the inclined portion 10*a*, 10*b*. The splash zone 32 is aligned with the water source 3 such that the fluid flowing out of the water surface 3 can impinge on the splash zone 32. The splash zone 32 includes a plurality of fluid distribution features 34 in the form of, for example, channels, to spread out the fluid after the flow is received by the splash zone 32. The inclined portion 10*a* or 10*b* may include an array of splash zones 32 aligned with the water source 32, for example, an array of nozzles to deliver water. In some embodiments, the array of splash zones 32 may be arranged along a lateral direction of the vertical film 10. e.g., along the y axis. Any suitable numbers (e.g., 2 to 100) of splash zones 32 can be provided.

The fluid from the water source 3 (e.g., an array of nozzles) can be distributed across the film 10 substantially evenly via the fluid distribution features 34 in the splash zone 32. The fluid distribution features 34 can have various configurations to achieve even distribution of fluid at the interface between the water source 3 and the splash zone 32. A method that can effectively direct water flow onto the vertical film 10 is to have the non-vertical splash zone 32 that contains specifically-designed channels 34. For example, in the embodiment depicted in FIG. 3, the channels 34 each have its upstream portion 34*a* across the splash zone 32, and radially spreads out to a downstream portion 34*b*. The channels 34 can distribute water across the inclined portion 10*a*, 10*b* evenly while the flow of the water moves vertically and downwardly.

The vertical film 10 includes a plurality of holes 12 each configured to receive a basket 50, as shown in FIGS. 1 and 2B. The holes 12 can be disposed in a vertical portion 110 of the vertical film 10. The vertical portion 110 can be a major portion of the vertical film 10 that is connected to the inclined portion 10*a*, 10*b*. In the embodiment of FIG. 2B, the vertical film 10 is laid over the support 24*b*, from which the inclined portion 10*a*, 10*b* translates to the vertical portion 110. The vertical portion 110 may have a substantially vertical orientation when the vertical film 10 is mounted in place.

The holes 12 can be grouped and distributed in various vertical zones of the vertical portion 110. The holes 12 can have any suitable sizes such as, for example, from about 50 mm to about 200 mm in diameter to support the basket of varying crops. The holes 12 can be arranged inline vertically and horizontally with water and nutrient routing features, or staggered to allow for gravity routed distribution of water across plant baskets.

Figure 4A:
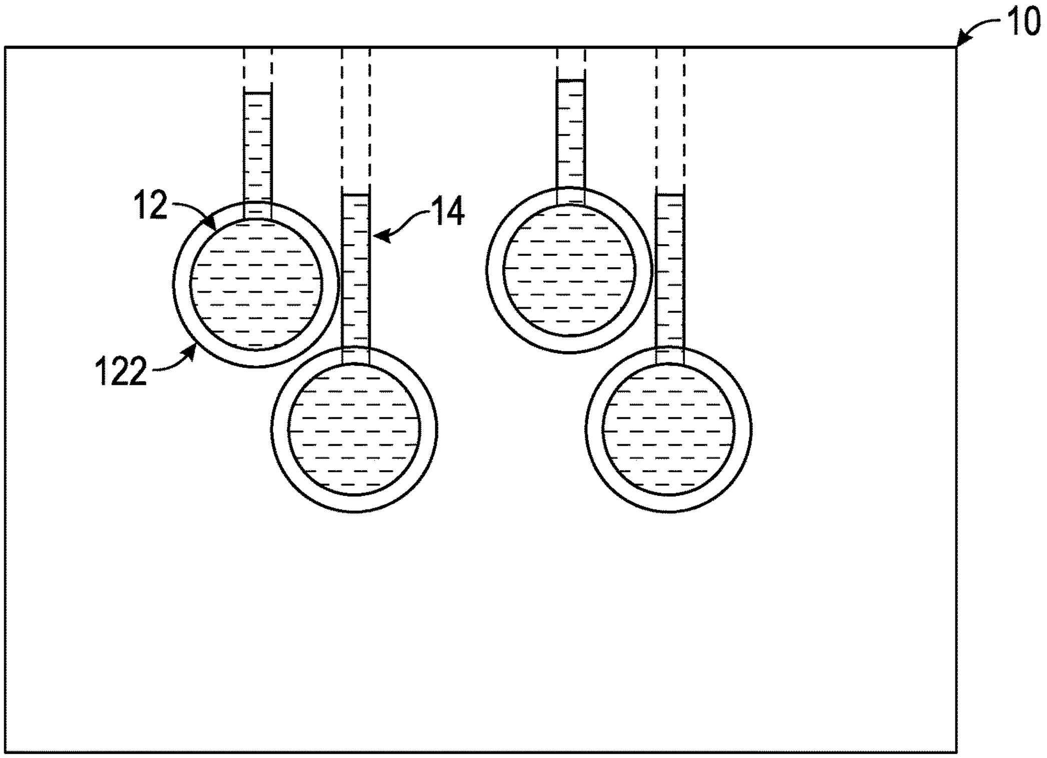
FIG. 4A illustrates a schematic diagram of a portion of a vertical film, according to one embodiment.
Figure 4B:
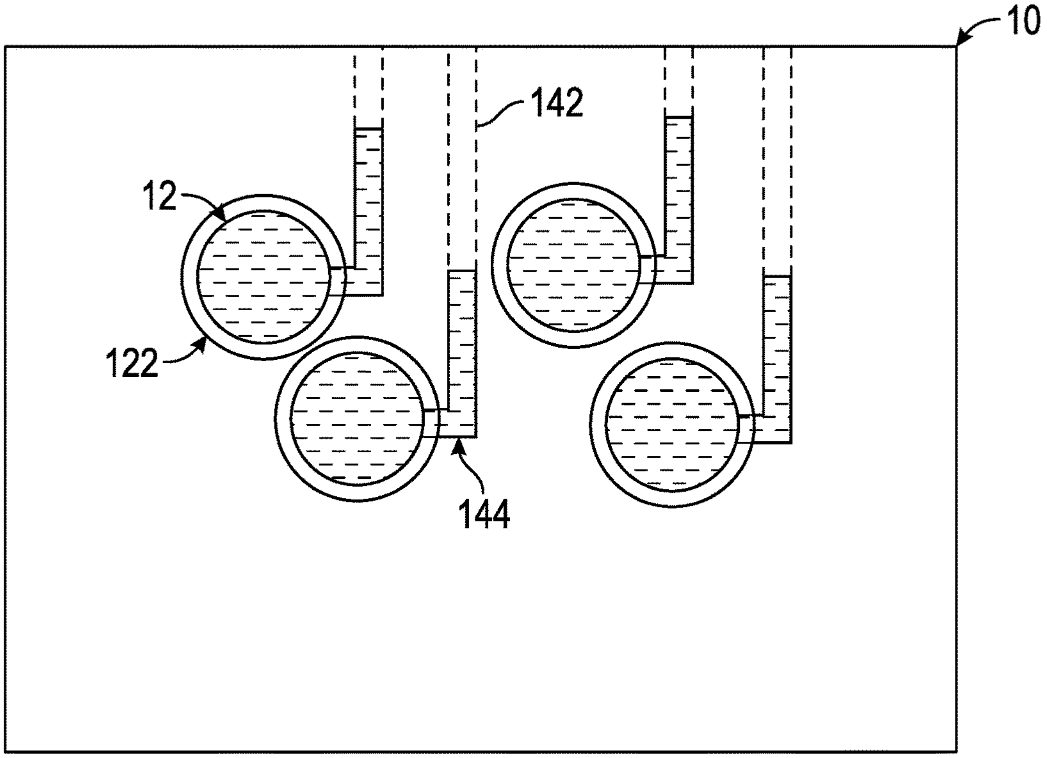
FIG. 4B illustrates a schematic diagram of a portion of a vertical film, according to one embodiment.
Figure 4C:
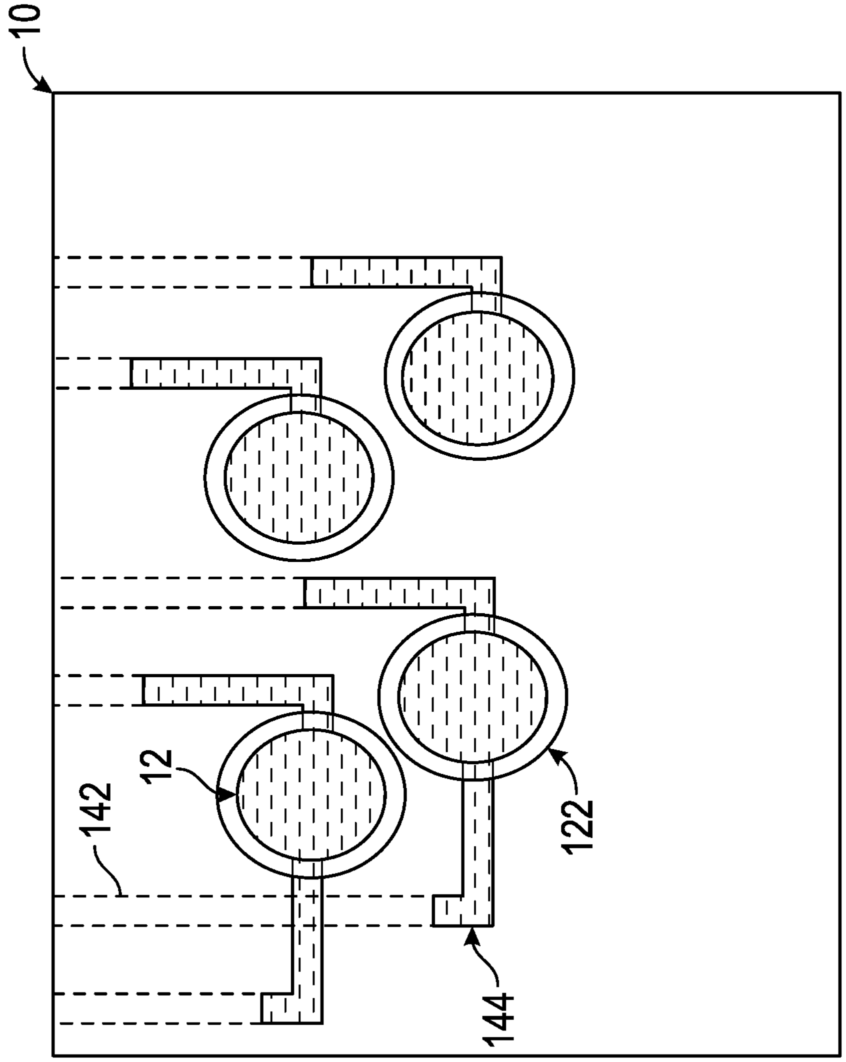
FIG. 4C illustrates a schematic diagram of a portion of a vertical film, according to another embodiment.

In some embodiments, water-guiding features such as fluid channels can be formed on a vertical portion of a vertical film to fluidly connect to the plurality of holes. As shown in the embodiments of FIGS. 4A-C, various fluid channels 14 are provided to fluidly connected to the holes 12. The fluid channels 14 each may have an upstream end fluidly connected to the water distribution features 34 in the inclined portion 10*a*, 10*b*, and a downstream end fluidly connected to an opening of the holes 12. The fluid channels 14 each are configured to flow fluid primarily by gravity and direct the fluid to the holes. When baskets or pods are received by the holes, water and/or nutrients can be distributed from the splash zone 32, spreading out evenly across the vertically hanging film 10 to access to the baskets or pods received by the respective holes 12. In the embodiment of FIG. 4A, the holes 12 are staggered in such that the respective substantially vertical channels 14 do not overlap. In the embodiment of FIGS. 4B-C, multiple fluid channels are provided to each basket or pod. At least one of the plurality of channels 14 includes a vertical channel portion 142 and a lateral channel portion 144 connected to the vertical channel portion 142. The vertical channel portion 142 fluidly connects to the splash zone. The lateral portion 144 fluidly connected to the respective holes 12. It is to be understood that the vertical channel portion has a substantially vertical orientation, and may be deviated from the z axis, for example, within 0) to 45 degrees. The lateral channel portion has a substantially horizontal orientation, and may be deviated from the x or y axis, for example, within 0 to 45 degrees.

Water is carried to the fluid channel via gravity. Baskets or pods that require more water can have larger channels or multiple channels. The surrounding area around a pod can be recessed to form a recessed area 122 at least partially surrounding the pod to allow the fluid channel to distribute water directly into the pod in place. When a basket is inserted into a hole, a lip may be formed surrounding the basket, which may block the water from entering the basket. The recessed area 122 can help to solve the issue with the lip of the basket or pod.

Figure 5C:
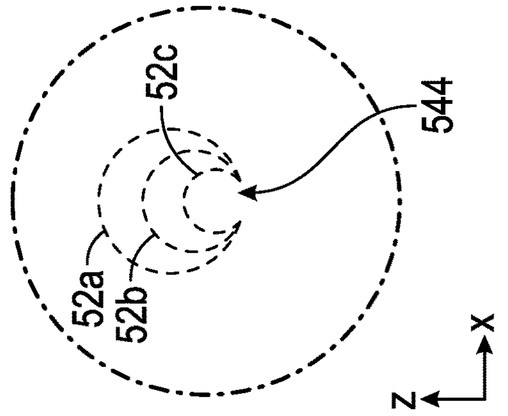
FIG. 5C illustrates a schematic diagram of a hole structure of a vertical film, according to another embodiment.
Figure 5B:
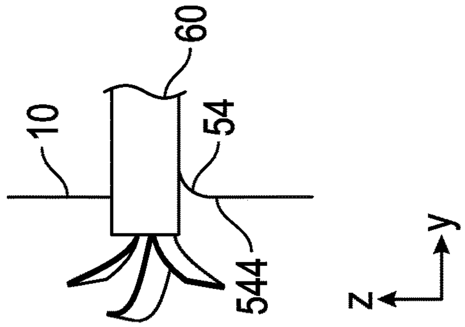
FIG. 5B illustrates a side perspective view of the vertical film of FIG. 5A.
Figure 5A:
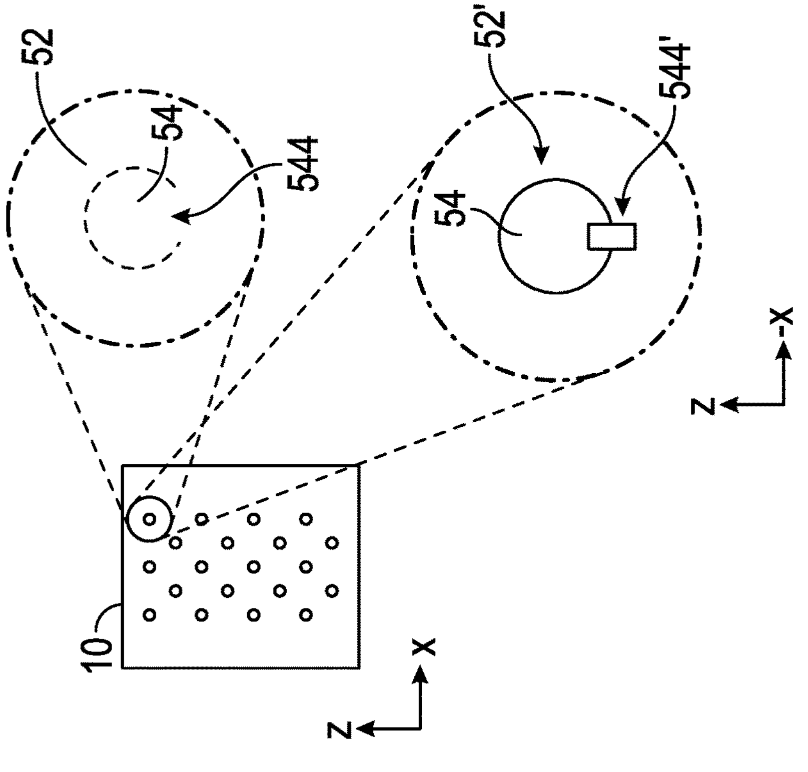
FIG. 5A illustrates a schematic diagram of a hole structure of a vertical film, according to one embodiment.

The holes 12 can be formed by any suitable methods. In one embodiment depicted in FIG. 5A, a perforated line 52 is formed on the film 10. The perforated line 52 may have a horseshoe shape to accommodate the shape of a basket. When a basket or pod 60 is pressed against the area 54 surrounded by the perforated line 52, and the film 10 breaks along the perforated line 52 and a hole is formed to receive the basket or pod 60 in position, as shown in FIG. 5B. A flap structure is formed by the area 54 connected to the un-perforated hinging area 544. The hole can also be formed by a cutout circle 52', as shown in FIG. 5A. An adhesive based hinge 544' can be provided to connect the flap structure 54 and support the basket 60 in place. In the embodiment depicted in FIG. 5C, the perforated lines 52*a-c* form horse-shoe shapes having different sizes and share a common hinging area 544. Holes with various sizes can be formed by breaking along the perforated line 52*a*. 52*b*, or 52*c* to receive baskets having the corresponding sizes. In some embodiments, a backing film can be positioned on the back side of the film 10. The backing film is fastened in place optionally with adhesive and covers the hole.

Various surface features described herein, such as fluid distribution features in an inclined portion and water-guiding features a vertical portion of a film, can be made on a major surface of a vertical film by various methods. In some embodiments, the vertical film may have surface features created by removing surface materials. In some embodiments, the vertical film may include a multilayer structure and the surface features may be created on a top layer. In some embodiments, the surface features may be formed on the major surface by heat treatment, embossing, indentation, etc. The surface features can have various shapes or sizes to direct fluid flow. The channels can contain features having a thickness, for example, 1 to 5 mm, that form a diversion channel for fluid being delivered by gravity to convert the vertical motion of the fluid into a sideways motion to intersect the plant basket. The features can have various shapes such as, for example, an "L" or "J" shape.

The vertical films described herein can be made by using a roll-to-roll process. In some embodiment, the films can be compressed between hot roller tools that provide pressure and heat to create micro-replicated features. These features can mimic shark skin as well as other structured patterns that interfere with the adhesion of bacteria and algae. Additional sheets of material can be layered with cutouts and additional features to provide fluid routing. These additional layers can be attached using adhesive, sonic welding or heat welding processes. The material making up the film or sheet is strong enough to hold the weight of itself, the plants/inserts and water on its surface while under some additional stress, for example, when the film is being oscillated. Another requirement for the materials is that the film material does not leach harmful chemicals into water since the film will be in contact with water that creates food. Additionally, the material is ideally light weight, inexpensive, and recyclable.

The vertical films described herein may be made of any suitable flexible materials such as, for example, one or more polymers including at least one of polyethylene terephthalate (PET) or high-density polyethylene (HDPE). The vertical film 10 may have any suitable size which can be customized for different growing scenarios, mounting structures as well as types of plants.

Other materials that could meet the requirements include thin metal or composites, but these will likely be heavier and more expensive but might have advantages with durability and weight handling. With minimal expense it might be possible to integrate a metal or composite filament as structural members to increase the weight handling of the product. A suitable metal may include, for example, aluminum or steel. A composite may include, for example, a fiberglass or carbon fiber.

In some embodiments, the vertical film may include surface features to reduce bacterial adhesion. The surface features may include micro-replicated surface features. The micro-replicated surface features can influence the growth of bacteria colonies on a surface and reduce bacterial adhesion by 30-40%.

In some embodiments, the vertical film may include a chemically-modified surface to reduce bacterial adhesion. Chemical surface modification of the films is also a possibility (in addition to the new physical surface modification) to inhibit growth of unwanted bacteria as well as other living organisms. The ability to reduce bacterial colony replication is important in water and air handling applications for agriculture. Antibiotic-resistant bacteria in farming and hydroponic vegetables is a concern. Even a moderate reduction in surface adhesion leading to colonization and bio-film formation could be of importance. In some embodiments, the vertical film may include structures to prevent mineral buildup.

Figure 6:
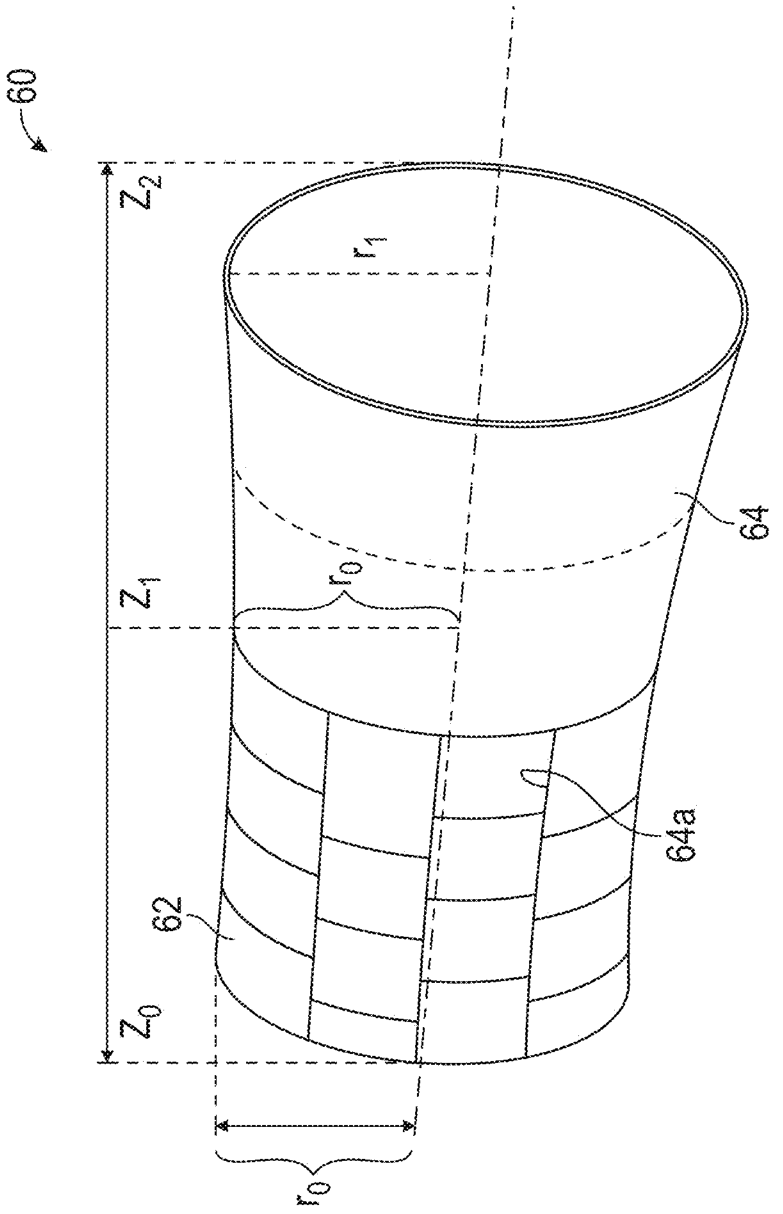
FIG. 6 illustrates a side perspective view of a basket, according to one embodiment.

FIG. 6 illustrates a side perspective view of a plant basket 60 that can be received by a hole of a vertical film, according to one embodiment. The basket 60 includes a root portion 62 and a stem portion 64 connected to the root portion 62. The root portion 62 includes one or more flow diverters 64*a* which can be fluid channels to distribute and direct water around the root portion 62. The stem portion 64 has a tapered shape. One end of the stem portion 64 is connected to the root portion 62 with a radius r1. The other end of the stem portion 64 is an open end with a radius r2. The ratio of r1/r2 is in a range, for example, from 1.01 to 1.10. The basket 60 has a tapered shape such that the basket 60 can be hold by the respective holes 12 in place primarily by a friction force.

Figure 7C:
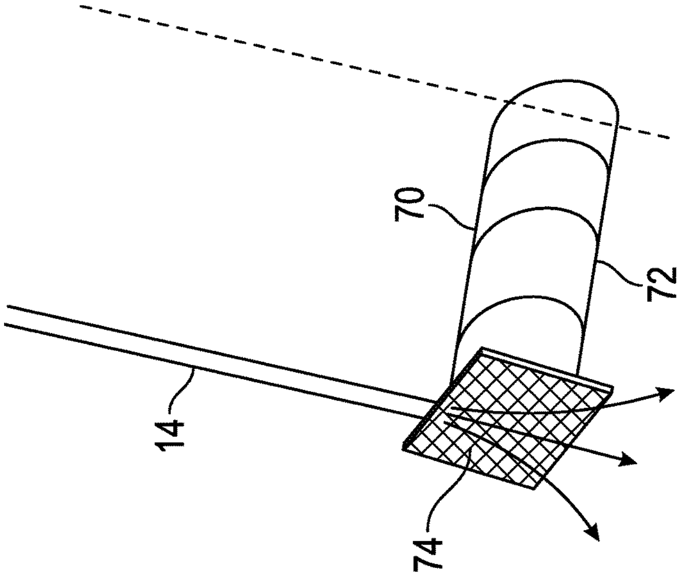
FIG. 7C illustrates a side perspective view of the water diverter of FIG. 7B received in a hole, according to another embodiment.
Figure 7B:
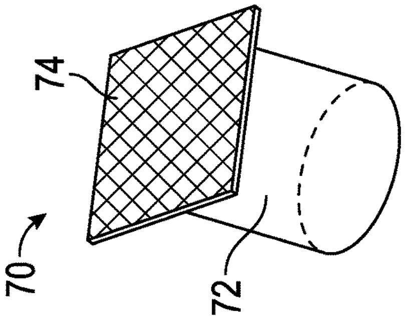
FIG. 7B illustrates a side perspective view of a water diverter, according to another embodiment.
Figure 7A:
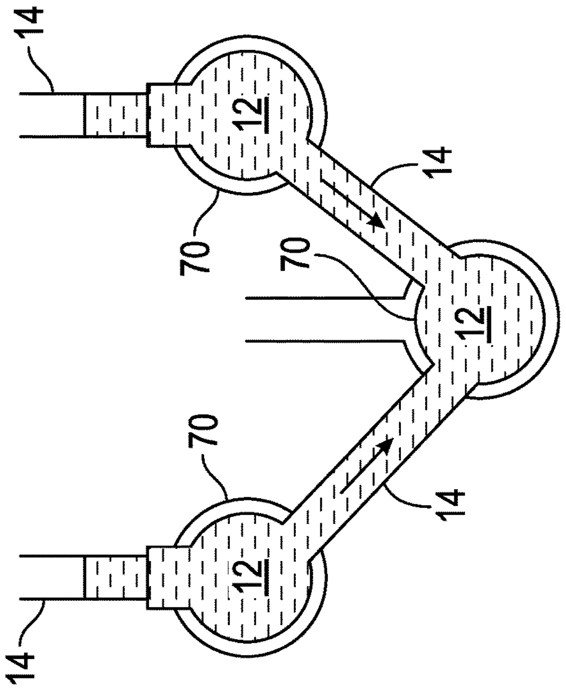
FIG. 7A illustrates a schematic diagram of a vertical film having holes receiving water diverters, according to one embodiment.

FIG. 7A illustrates a schematic diagram of a film with the holes 12 receiving water diverter insert 70, according to one embodiment. The one or more water diverter insert 70 received by the respective holes 12 are configured to control fluid flow adjacent the respective holes 12. In the embodiment of FIG. 7A, the water diverter insert 70 can direct water from an input channel 14 to an output channel 14 such that water can bypass the hole 12 with the water diverter insert 70 in place. When the water diverter is not present in a certain hole, water may flow from the input fluid channel to the empty hole, which may introduce water leakage.

FIG. 7B illustrates a side perspective view of a water diverter insert 70, according to one embodiment. The water diverter insert 70 includes a body 72 to be received by the hole 12. Water flow diverter structures such as fluid channels may be formed on the body 72 to direct water around the body 72 such that water can bypass the hole 12 with the water diverter insert 70 in place. In some embodiments, the water diverter insert 70 may further include a water distribution feature 74 to spread out the fluid from the input channel 14. The water distribution feature 74 can be formed at an end surface of the body 72 to direct the incoming water.

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

LISTING OF EXEMPLARY EMBODIMENTS

Embodiment 1 is a cultivation system comprising:

a vertical film extending substantially along a vertical direction, the vertical film comprising a plurality of holes each configured to receive a basket, the vertical film having a major surface including a plurality of water-guiding features to flow fluid primarily by gravity and direct the fluid to the holes; and a mounting mechanism disposed adjacent to a top edge of the vertical film.

Embodiment 2 is the cultivation system of embodiment 1, wherein the plurality of water-guiding features comprises one or more channels fluidly connected to the plurality of holes.

Embodiment 3 is the cultivation system of embodiment 1 or 2, wherein the vertical film further comprises a splash zone disposed adjacent to the top edge of the vertical film, the splash zone comprising a plurality of fluid distribution features fluidly connected to plurality of water-guiding features.

Embodiment 4 is the cultivation system of embodiment 3, wherein the plurality of fluid distribution features comprises a plurality of fluid distribution channels.

Embodiment 5 is the cultivation system of any one of embodiments 1-4, wherein the vertical film further comprises a recessed area at least partially surrounding each of the plurality of holes, the recessed area fluidly connected to the water-guiding features.

Embodiment 6 is the cultivation system of any one of embodiments 1-5, wherein at least one of water-guiding features comprises a vertical channel and a lateral channel connected to the vertical channel, the lateral channel fluidly connected to the respective holes.

Embodiment 7 is the cultivation system of any one of embodiments 1-6, wherein the mounting mechanism comprises one or more of a latching hook, a first support, a cable connecting the latching hook to the first support, and a clamping mechanism.

Embodiment 8 is the cultivation system of any one of embodiments 1-7, wherein the vertical film comprises an inclined portion and a vertical portion downstream of the inclined portion.

Embodiment 9 is the cultivation system of any one of embodiments 1-8, further comprising one or more water diverters each received by the respective holes and configured to control fluid flow adjacent the respective holes.

Embodiment 10 is the cultivation system of any one of embodiments 1-9, wherein the baskets each comprises a root portion and a stem portion connected to the root portion.

Embodiment 11 is the cultivation system of embodiment 10, wherein the root portion comprises one or more flow diverters.

Embodiment 12 is the cultivation system of embodiment 10 or 11, wherein the stem portion has a tapered shape.

Embodiment 13 is the cultivation system of any one of embodiments 1-12, wherein the basket has a tapered shape such that the basket is hold by the respective holes in place primarily by a friction force.

Embodiment 14 is the cultivation system of any one of embodiments 1-13, further comprising a water and nutrient catch disposed adjacent to a bottom edge of the vertical frame.

Embodiment 15 is the cultivation system of embodiment 14, further comprising a water line extending from the top edge of the vertical film to the water and nutrient catch.

Embodiment 16 is the cultivation system of any one of embodiments 1-15, wherein the vertical film comprises one or more polymers including at least one of polyethylene terephthalate (PET) or high-density polyethylene (HDPE).

Embodiment 17 is the cultivation system of any one of embodiments 1-16, wherein the vertical film comprises surface features to reduce bacterial adhesion.

Embodiment 18 is the cultivation system of embodiment 17, wherein the surface features comprise micro-replicated surface features.

Embodiment 19 is the cultivation system of any one of embodiments 1-18, wherein the vertical film comprises a chemically-modified surface to reduce bacterial adhesion.

Embodiment 20 is the cultivation system of any one of embodiments 1-19, the vertical film comprises surface features to reduce mineral buildup.

Embodiment 21 is the cultivation system of any one of embodiments 1-20, wherein the holes include one or more horseshoe shapes of a perforated line, optionally, the horseshoe shapes have different sizes and are connected at a hinging area.

Reference throughout this specification to "one embodiment." "certain embodiments," "one or more embodiments," or "an embodiment," whether or not including the term "exemplary" preceding the term "embodiment." means that a particular feature, structure, material, or characteristic described in connection with the embodiment is included in at least one embodiment of the certain exemplary embodiments of the present disclosure. Thus, the appearances of the phrases such as "in one or more embodiments." "in certain embodiments." "in one embodiment." or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about." Furthermore, various exemplary embodiments have been described. These and other embodiments are within the scope of the following claims.

What is claimed is:

1. A cultivation system comprising:

a vertical film extending substantially along a vertical direction, the vertical film comprising a plurality of holes each configured to receive a basket, the vertical film having a major surface including a plurality of open surface fluid channels formed on the major surface and exposed along the major surface, the plurality of open surface fluid channels being configured to convey fluid primarily by gravity along the major surface, wherein each of the plurality of open surface fluid channels comprises a downstream end fluidly connected to an opening of a respective one of the plurality of holes; and one or more of a latching hook, cable, structural filament extending along the top edge, adhesive, hook-and-loop fastener, or an integral hook, disposed adjacent to a top edge of the vertical film for attaching the vertical film to an overhead fixture.

2. The cultivation system of claim 1, wherein the plurality of open surface fluid channels are fluidly connected to the plurality of holes.

3. The cultivation system of claim 1, wherein the vertical film further comprises a splash zone disposed adjacent to the top edge of the vertical film, the splash zone comprising a plurality of fluid distribution channels fluidly connected to the plurality of open surface fluid channels.

4. The cultivation system of claim 3, wherein each of the plurality of fluid distribution channels has an upstream portion across the splash zone and a downstream portion that radially spreads from the upstream portion.

5. The cultivation system of claim 1, wherein the vertical film further comprises a recessed area at least partially surrounding each of the plurality of holes, the recessed area fluidly connected to the plurality of open surface fluid channels and configured to direct fluid into a basket received in the respective hole.

6. The cultivation system of claim 1, wherein at least one of the plurality of fluid channels comprises a vertical channel and a lateral channel connected to the vertical channel, the lateral channel fluidly connected to the respective holes.

7. The cultivation system of claim 1, wherein the mounting mechanism comprises one or more of a latching hook, a first support, a cable connecting the latching hook to the first support, and a clamping mechanism.

8. The cultivation system of claim 1, wherein the vertical film comprises an inclined portion and a vertical portion downstream of the inclined portion.

9. The cultivation system of claim 1, further comprising one or more water diverters inserts, each received by the respective holes and configured to control fluid flow adjacent the respective holes.

10. The cultivation system of claim 1, wherein the baskets each comprises a root portion and a stem portion connected to the root portion.

11. The cultivation system of claim 10, wherein the root portion comprises one or more fluid channels configured to distribute and direct water around the root portion.

12. The cultivation system of claim 10, wherein the stem portion has a tapered shape.

13. The cultivation system of claim 1, further comprising one or more water diverters inserts to be selectively received by the holes, each water diverter insert comprising a body sized to be received in a corresponding one of the holes.

14. The cultivation system of claim 13, wherein the one or more water diverter inserts are configured to direct fluid from an input open surface fluid channel to an output open surface fluid channel such that fluid bypasses the corresponding holes.

15. The cultivation system of claim 1, further comprising a water and nutrient catch disposed adjacent to a bottom edge of the vertical frame.

16. The cultivation system of claim 15, further comprising a water line extending from the top edge of the vertical film to the water and nutrient catch.

17. The cultivation system of claim 1, wherein the vertical film comprises one or more polymers including at least one of polyethylene terephthalate (PET) or high-density polyethylene (HDPE).

18. The cultivation system of claim 1, wherein at least some of the plurality of open surface fluid channels comprise micro-replicated surface features.

19. The cultivation system of claim 1, wherein the vertical film comprises a chemically modified surface to reduce bacterial adhesion.

20. The cultivation system of claim 1, wherein the holes include one or more horseshoe shapes of a perforated line, wherein the horseshoe shapes have different sizes and are connected at a common hinging area.

* * * * *